United States Patent
Millar et al.

(10) Patent No.: US 9,161,398 B2
(45) Date of Patent: Oct. 13, 2015

(54) LIGHTING DEVICE

(71) Applicant: iLight, LLC, Kaysville, UT (US)

(72) Inventors: Gary Bret Millar, Highland, UT (US); Joshua James Wiscombe, Layton, UT (US)

(73) Assignee: iLight, LLC, Kaysville, UT (US)

( * ) Notice: Subject to any disclaimer, the term of this patent is extended or adjusted under 35 U.S.C. 154(b) by 85 days.

(21) Appl. No.: 14/055,756

(22) Filed: Oct. 16, 2013

(65) Prior Publication Data

US 2015/0102739 A1     Apr. 16, 2015

(51) Int. Cl.
*H05B 41/28*   (2006.01)
*H05B 33/08*   (2006.01)
*H02H 9/04*    (2006.01)
*H02H 3/10*    (2006.01)

(52) U.S. Cl.
CPC .............. *H05B 33/0806* (2013.01); *H02H 3/10* (2013.01); *H02H 9/04* (2013.01); *H05B 33/0809* (2013.01); *H02H 9/042* (2013.01)

(58) Field of Classification Search
CPC ........... H02H 9/04; H02H 9/042; H02H 9/06; H02H 9/005; H02H 3/10; H02H 3/105; H02H 3/24; H02H 9/041
USPC ...... 315/224, 185 R, 185 S, 247, 246, 200 R, 315/209 R, 241 R, 242, 243, 291, 307–326
See application file for complete search history.

(56) References Cited

U.S. PATENT DOCUMENTS

| | | | |
|---|---|---|---|
| 6,320,330 B1 | 11/2001 | Haavisto et al. | |
| 7,029,145 B2 | 4/2006 | Frederick | |
| 7,490,957 B2 | 2/2009 | Leong et al. | |
| 7,511,437 B2 | 3/2009 | Lys et al. | |
| 8,242,704 B2 | 8/2012 | Lethellier | |
| 8,405,319 B2 | 3/2013 | Sadwick et al. | |
| 8,410,720 B2 | 4/2013 | Holec et al. | |
| 2003/0011538 A1 | 1/2003 | Lys et al. | |
| 2003/0197425 A1 | 10/2003 | Montante | |
| 2009/0200951 A1 | 8/2009 | King | |
| 2011/0057572 A1 | 3/2011 | Kit et al. | |
| 2011/0248836 A1 | 10/2011 | Brandes et al. | |
| 2011/0304943 A1* | 12/2011 | Barton et al. | ................. 361/104 |
| 2013/0043792 A1 | 2/2013 | Reed | |

FOREIGN PATENT DOCUMENTS

WO     WO 2012/061999     5/2012

OTHER PUBLICATIONS

Atul Singh, Using Voltage Supervisor for Input Over- Voltage Protection in LED Drivers, Texas Instruments Application Report SLVA594, May 2013, 7 pages, Dallas, Texas, US.

* cited by examiner

*Primary Examiner* — Tuyet Vo

(74) *Attorney, Agent, or Firm* — Thorpe North & Western

(57) ABSTRACT

A system is described for providing unconditioned power using an alternating current (AC) power source in order to power light emitting diodes (LEDs). The system may include a plurality of light emitting diodes (LEDs), a microprocessor to send pulse-width modulated power signals to power the plurality of LEDs, a zener diode to limit a voltage provided to the microprocessor from the AC power source, and a varistor in series with the zener diode to clamp down the voltage from the AC power source to a pre-defined value to resist current in rush to the microprocessor.

13 Claims, 4 Drawing Sheets

LIGHTING DEVICE

BACKGROUND

Indoor and outdoor lighting may be used for a variety of purposes. For example, decorative lighting may be popular during the holiday season and other times of the year. The decorative lighting may include a string of multiple lights. The decorative lighting may display numerous colors, such as red, blue and green. In addition, the decorative lighting may flash, dim, brighten, and blink according to a predefined setting.

As another example, the lighting may be included as part of a home automation system. For example, the home automation system may allow the indoor lighting to be controlled remotely. The lighting scheme (e.g., brightness, time of day when the lights are turned on and off) may be customized to save electricity and increase the lifetime of the light bulbs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for providing unconditioned power using an alternating current (AC) power source in order to power a plurality of light emitting diodes (LEDs). The plurality of LEDs may include a red LED, a blue LED, and a green LED, with each LED having a rating near or above 5 volts. A microprocessor may send pulse-width modulated power signals to power the plurality of LEDs. In addition, current sent to the LEDs by the microprocessor may be interleaved so that one LED is powered at a time. In one example, the microprocessor may be powered from a same power source as the LEDs (i.e., the AC power source).

A zener diode may limit a voltage provided to the microprocessor from the AC power source. A varistor (e.g., a metal-oxide varistor) in series with the zener diode may clamp down the voltage from the AC power source to a pre-defined value to resist current in rush to the microprocessor. A capacitor may be configured to smooth power provided to the microprocessor. One or more diodes may perform half wave rectification of the AC power source. In addition, one or more resistors may be in series with the varistor and the zener diode to restrict current supplied to the microprocessor and LEDs with a rating of 5 volts or less. In one example, the LEDs, microprocessor, zener diode, varistor, capacitor, diode, and resistor may be on a single printed circuit board (PCB).

In another example, the power supply may include a voltage stabilizer to hold a voltage from the AC power to a pre-defined voltage value, a diode for half wave rectification of the voltage from the AC power, a transient suppressor to clamp the voltage, and a light emitting diode (LED) to receive the voltage and display a visual light. In one example, the voltage stabilizer may be a zener diode or an avalanche diode, and the transient suppressor may be a varistor. In addition, the voltage stabilizer may be in series with the transient suppressor.

Figure 1:
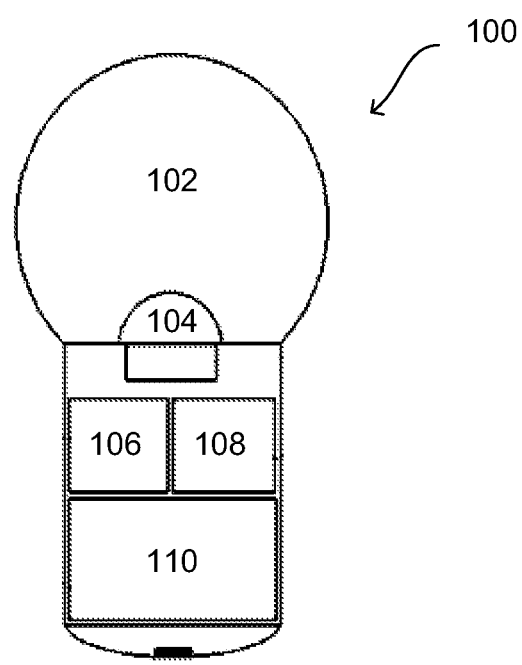
FIG. 1 is an illustration of a light emitting diode (LED) bulb according to an example of the present technology.

FIG. 1 illustrates an example of a light emitting diode (LED) bulb 100. The LED bulb 100 may be included in the string of multiple light bulbs (e.g., decorative lights) or used as a single stand-alone light bulb. Alternatively, the LED bulb 100 may be included in a home, office building, factory, etc. The LED bulb 100 may have an unconditioned power circuit that may be powered from an alternating current (AC) wiring outlet in the home or office building. The AC wiring outlet may supply 100/110 volts, 240 volts, etc. In one configuration, the CPU 108 or power microprocessor associated with the LED bulb 100 may receive instructions over the AC wiring, such as instructions to turn off, turn on, dim, brighten, change color, etc. In one example, the power microprocessor associated with the LED bulb 100 may receive the instructions using a power line communications (PLC) protocol from a communications processor.

The LED bulb 100 may include a lighting area 102 that is composed of a polycarbonate plastic with a frosted finish. The lighting area 102 may be spherical, cylindrical, triangular, cubical, conical, etc. Alternatively, the lighting area 102 may be composed of various materials, such as plastic, glass, other transparent or semi-transparent material, etc.

The LED bulb 100 may include a light source 104. In one example, the light source 104 may be at least one light emitting diode (LED). Further, the LED may include a red light emitting diode, a green light emitting diode, and a blue light emitting diode. In other examples, the light source 104 may include electron stimulated luminescence (ESL) light bulbs, incandescent lamps (e.g., halogen lamps), electroluminescent (EL) lamps (e.g., LEDs, light-emitting electrochemical cells), gas discharge lamps (e.g., fluorescent lamps, induction lighting, neon lamps, argon lamps), high-intensity discharge lamps, etc.

In one example, the LED bulb 100 may include a power line communications (PLC) module or circuit 106. The PLC 106 may allow a central processing unit (CPU) 108 or power microprocessor included in the light bulb 100 to connect to the AC wiring to receive communication signals. Alternatively, the logic for power line communications may reside within the central processing unit (CPU). In addition, the CPU 108 or power microprocessor 108 may be included on a circuit board with the LED(s) 104. The terms CPU and power microprocessor may be used interchangeably in this discussion of FIG. 1. As a result, the LED bulb 100 with the power line communication (PLC) may be employed in home automation systems or decorative lighting systems that use household electrical wiring for communication. The PLC 106 may isolate the AC power line from the control circuitry, as well as filter transit electrical noise.

As mentioned earlier, the LED bulb 100 may include a central processing unit (CPU) 108 or power microprocessor. The CPU 108 may control a color and/or brightness level associated with the LED bulb 100 by controlling the timing and amounts of power sent to the LEDs. In addition, the CPU 108 may store lighting settings and process signals received via the PLC 106. The CPU 108 may include: an oscillator to control clock timing, an input-output (I/O) port to receive signals from the PLC 106, and an Electrical Erasable Programmed Read Only Memory (EEPROM) to store lighting settings.

In one example, the EEPROM may store the lighting settings even in the absence of power. The CPU 108 may include functionality to control the pulse width modulation (PWM) of the LEDs in the light source 104. In other words, the microcontroller may control the brightness level and the color produced at the light source 104 by controlling the duty cycle and strength of the power sent to each LED in the light source 104. The number of colors and brightness may be increased or decreased based on the information communicated to the microprocessor. In addition, the microcontroller may process the signals received via the PLC 106 to enable control of the LED bulbs 100.

The LED bulb 100 may include a power unit 110. In one example, the power unit 110 may convert the AC voltage (e.g., 110-120 AC voltage) to a voltage that is suitable to power the LED bulb 100. The power unit may provide a half wave rectification that is smoothed and limited to a specific voltage range. In this case, the voltage can be considered an unconditioned voltage with which the CPU (i.e., the microprocessor) is able to operate.

Figure 2:
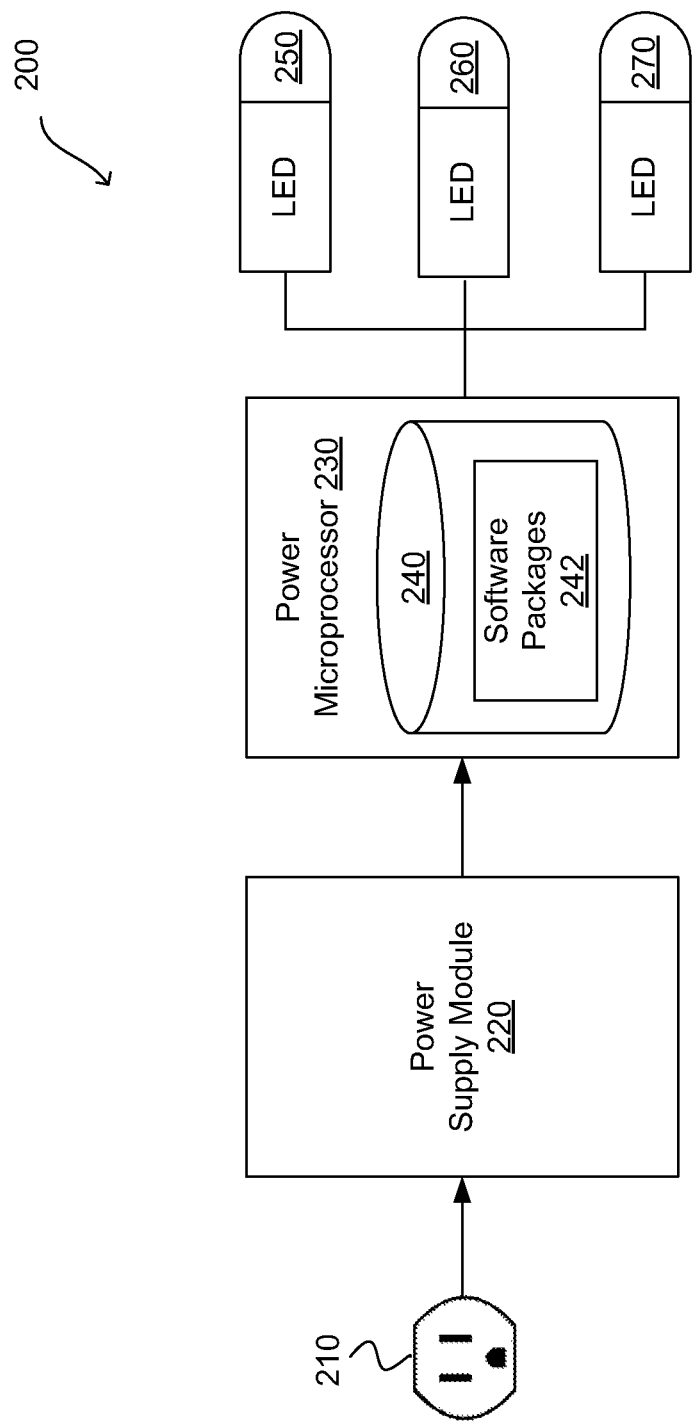
FIG. 2 is a system for providing unconditioned power using an alternating current (AC) power source in order to power light emitting diodes (LEDs) according to an example of the present technology.

FIG. 2 is a system 200 for providing unconditioned power using an alternating current (AC) power source in order to power light emitting diodes (LEDs). The system 200 may include a power supply module 220, a power microprocessor 230, and a plurality of LEDs 250, 260 and 270. The plurality of LEDs may include a red LED, a green LED, and a blue LED. The power supply module 220 may receive AC power from a power source 210. In one example, the AC power may be in the range of 108 volts to 132 volts. In addition, the AC power may have a frequency in the range of 50-60 hertz (Hz).

The power supply module 220 may step down the 108-132 volts of AC power received from the power source 210 to a voltage that is suitable to power the LEDs. In one example, the LEDs may run on approximately 2.8 volts to 5.5 volts. Thus, the power supply module 220 may step down the 108-132 volts of AC power to approximately 2.8-5.5 volts. The power supply module 220 may include a plurality of circuit elements for stepping down the AC power, including but not limited to, zener diodes. varistors, capacitors, diodes and/or resistors. The plurality of circuit elements may operate in combination to limit the voltage provided to the power microprocessor 230 from the AC power source. The power microprocessor 230 may send pulse-width modulated power signals to power the plurality of LEDs. In one example, the plurality of circuit elements, the power microprocessor 230 and the LEDs may be included in a light bulb.

Thus, the combination of circuit elements may function to adjust the voltage and amperage of the system 200 to correspond with the operating characteristics of the LEDs. In general, the varistor, resistor and capacitor may function to control the voltage of the system 200 and the zener diode may function to control the amperage of the system 200. In one example, the LEDs may successfully operate even when the system 200 reaches a minimum or maximum voltage/amperage level. As an example, the average amperage produced by the system 200 may be approximately 34.9 milliamps (mA).

However, the average amperage may vary slightly based on the circuit elements and the amount of AC power being provided to the system 200. The AC power may be within 108-132 volts and the frequency of the AC power may have a 10% tolerance. In addition, the capacitor, resistor and varistor may each have up to a 10% variance. Thus, the minimum amperage produced by the system 200 may be approximately 29.5 mA. Therefore, the LEDs may be rated to operate on at least 29.5 mA or lower. In other words, the LEDs may not attempt to draw more power than the system 200 is capable of producing.

The power microprocessor 230 may send pulse-width modulated power signals to power the plurality of LEDs. The power microprocessor 230 may include a data store 240 that stores software packages 242. The term "data store" may refer to any device or combination of devices capable of storing, accessing, organizing, and/or retrieving data. The data store 240 may include volatile or non-volatile read-only memory (ROM), erasable programmable read only memory (EPROM), electrically erasable programmable read-only memory (EEPROM), or flash memory.

The software packages 242 may enable the power microprocessor 230 to send interleaved current to the plurality of LEDs so that one LED is powered at a time. In one example, each LED may be powered with 25 mA of current. If two LEDs were powered at the same time, the 50 mA provided to the two LEDs may exceed the maximum amperage produced by the system 200. In addition, powering two LEDs at the same time may decrease the voltage provided to the LEDs to less than the 2.8-5.5 volts required by the LEDs to function. Therefore, the software packages 242 may ensure that a single LED is powered at a time to avoid exceeding the system's maximum voltage and amperage levels and crashing the system 200.

The power microprocessor 230 may power the plurality of LEDs so that each LED is powered on when the remaining LEDs are powered off. For example, the power microprocessor 230 may power the first LED 250 (e.g., the red LED) when the second LED 260 (e.g., the green LED) and the third LED 270 (e.g., the blue LED) are powered off. The power microprocessor 230 may power the second LED 260 when the first and third LEDs 250 and 270 are powered off. The power microprocessor 230 may power the third LED 270 when the first and second LEDs 250 and 260 are powered off. In one example, the power microprocessor 230 may change a duty cycle (i.e., a pulse length) of one or more of the LEDs for producing colors other than red, green and blue. For example, the power microprocessor 230 may increase the pulse length of the red LED, reduce the pulse length of the green LED, and increase the pulse length of the blue LED to produce a purple-colored lighting. The power microprocessor 230 may increase or decrease the voltage to brighten or dim the LEDs, respectively. Therefore, the LEDs may perform a number of actions using the power microprocessor 230, such as turning on, turning off, changing color, dimming, brightening, etc.

In one configuration, the power microprocessor 230 may include a built-in clock circuit (not shown in FIG. 2). The built-in clock circuit may ensure that variations in temperature and/or voltage do not affect the timing of the plurality of LEDs. For example, the three LEDs may receive power according to an internal clock circuit of the power microprocessor 230 that varies based on the amount of voltage and the variance associated with each circuit component. However, the power signals received at three LEDs may become out of sync after a certain time period. Therefore, the built-in clock circuit may synchronize the power signals sent to the LEDs.

In one example, the power supply module 220 may include the varistor to clamp down the voltage from the AC power source to a pre-defined value (e.g., approximately 0 volts) to reduce in rush current to the microprocessor. When the AC power comes into the power supply module 220, in rush current may be reduced if the AC power corresponds to a zero crossing. In other words, the AC power may be represented by a sinusoidal waveform and the zero crossing may indicate that the voltage is substantially at 0 volts. If the AC power is received when the voltage is greater than 0 volts (e.g., 70 volts), then the higher voltage may negatively impact the power supply module 220. Thus, the varistor may clamp the voltage until the voltage reaches 0 volts. When the voltage reaches 0 volts, the varistor may release its clamp and the voltage may flow to the power supply module 220.

Although removing the varistor and decreasing the resistance of the resistor may reduce the heat generated by the electrical components, the power supply module 220 may be susceptible to in rush current. The in rush current may result from the lowered resistance of the resistor. However, increasing the resistance of the resistor may result in increased heat in the power supply module 220. Although a heat sink may possibly reduce the heat when using the resistor with increased resistance, the additional cost and extra space may be prohibitive. For example, the electrical components may be assembled within a light bulb and an additional heat sink may exceed the physical dimensions of the light bulb. Therefore, the combination of the varistor and the resistor may protect the power supply module 220 from in rush current, as well as regulate the temperature and a steady rate of AC power.

In one configuration, the power supply module 220 may provide unconditioned alternating current (AC) power. The power supply module 220 may include a voltage stabilizer to hold a voltage from the AC power to a pre-defined voltage value, a diode for half wave rectification of the voltage from the AC power, and a transient suppressor to clamp the voltage. The power supply module 220 may include a resistor in series with the transient suppressor to smooth a power signal. The resistor and a capacitor may be in series with the transient suppressor and the voltage stabilizer. In addition, the capacitor may be in parallel with the voltage stabilizer to smooth the current. In one example, the transient suppressor may be a varistor and the voltage stabilizer may be a zener diode or an avalanche diode.

Figure 3:
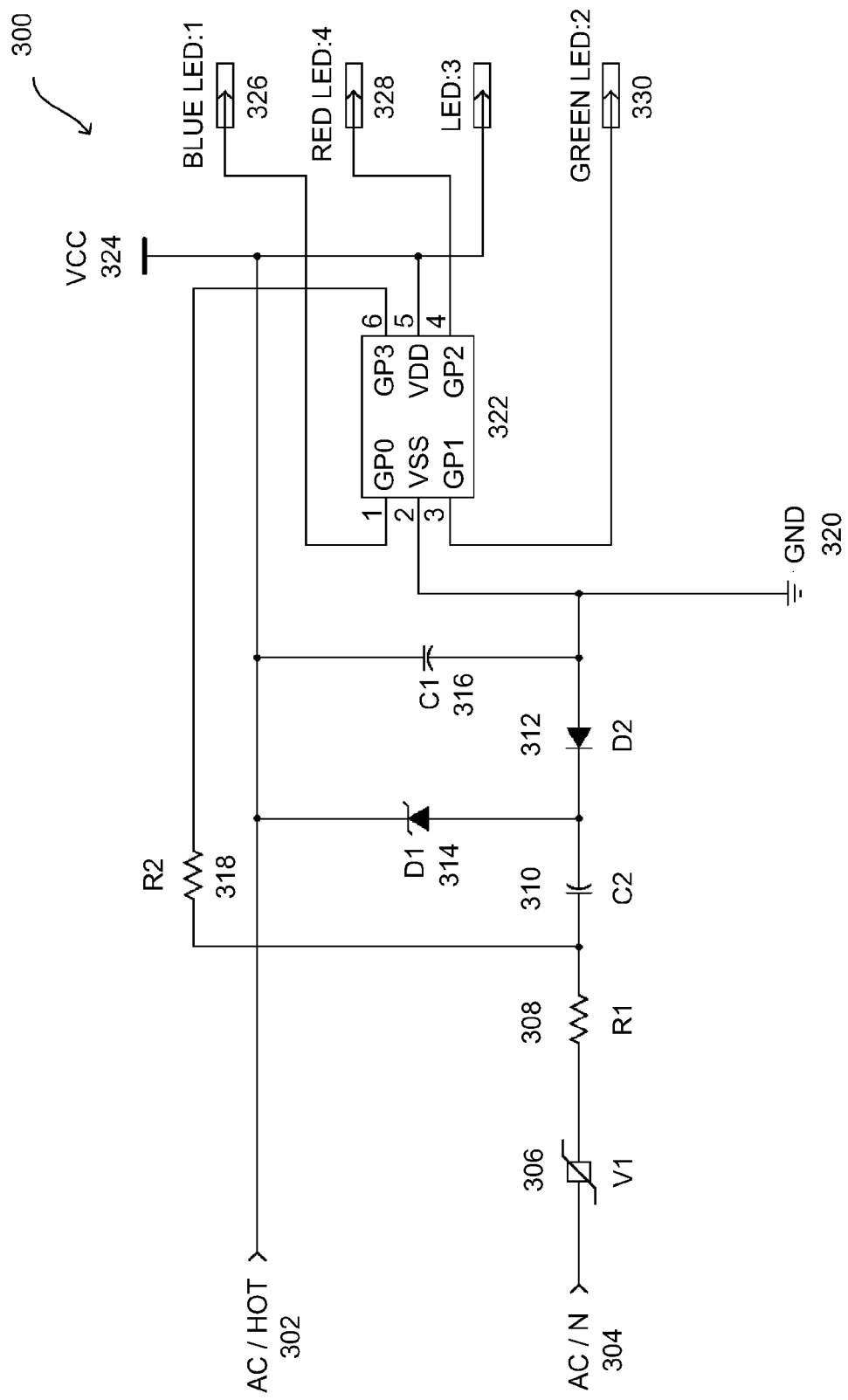
FIG. 3 is a more detailed circuit diagram for providing unconditioned power using an alternating current (AC) power source in order to power light emitting diodes (LEDs) according to an example of the present technology.

FIG. 3 is a more detailed circuit diagram 300 for providing unconditioned power using an alternating current (AC) power source in order to power light emitting diodes (LEDs). The AC power (e.g., 110 volts) may be received at a hot terminal 302 and a neutral terminal 304. The circuit diagram 300 may include a varistor 306, resistors 308 and 318, capacitors 310 and 316, a diode 312, and a zener diode 314. The circuit diagram 300 may include a ground 320 and a collector supply voltage (i.e., Vcc) 324. In one example, the varistor 306, resistors 308 and 318, capacitors 310 and 316, the diode 312, and the zener diode 314 may operate in combination to limit the voltage provided to a power microprocessor 322 from the AC power source. The power microprocessor 322 may send pulse-width modulated power signals to power a blue LED 326, a red LED 328, and a green LED 330.

In one configuration, the power microprocessor 322 may receive various instructions over an AC wiring, such as instructions to turn off, turn on, dim, brighten, change color, etc. For example, the power microprocessor 322 may receive the instructions using a power line communications (PLC) protocol over a power line network. Alternatively, the power microprocessor 322 may receive the instructions over an Ethernet connection using other communication protocols, such as transmission control protocol (TCP). In addition, the resistor 318 (e.g., a 5.1 million (M) ohm resistor) may enable, in part, the power microprocessor 322 to receive the instructions using the PLC protocol over the power link network.

In one example, the varistor 306 may clamp down the voltage from the AC power source to a pre-defined value to resist current in rush to the power microprocessor 322. The capacitors 310 and 316 may be configured to smooth power provided to the power microprocessor 322. The diode 312 may provide half wave rectification of the AC power source. The resistor 308 may restrict the current supplied to the power microprocessor 322 and the zener diode 314 may limit the voltage provided to the power microprocessor 322.

In one example, the zener diode may limit the voltage provided to the microprocessor from the AC power source. The varistor (e.g., a metal-oxide varistor) may be positioned in series with the zener diode to clamp down the voltage from the AC power source to a pre-defined value (e.g., 2.8 volts to 5.5 volts). The capacitor may be configured to smooth power provided to the microprocessor. The diode may provide half wave rectification of the AC power source. In half wave rectification, the voltage from the AC power source may be reduced because either a positive half or a negative half of an AC waveform associated with the AC power is blocked. In addition, the resistor may be positioned in series with the varistor and the zener diode to restrict current supplied to the microprocessor and LEDs with a rating of 5 volts or less.

In one example, the LEDs, microprocessor, zener diode, diode, varistor, capacitor and resistor may be on a single printed circuit board (PCB). The PCB may include a copper foil to act as a heat sink, thereby reducing the heat generated by the electrical components. Alternatively, the PCB may include a foil composed of other heat dissipating materials, such as aluminum alloy or a composite material. The heat generated by each of the electrical components may not exceed a maximum operating temperature included in a manufacturer's specification for that electrical component.

Figure 4A:
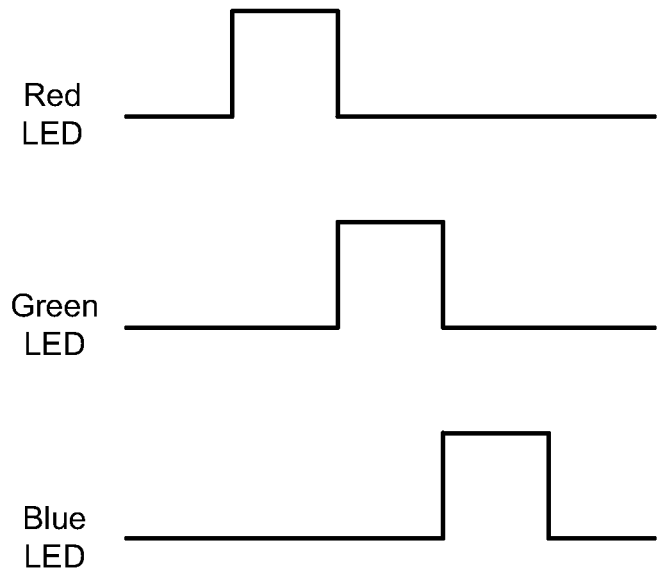
FIGS. 4A and 4B are square waveforms indicating when a particular light emitting diode (LED) out of a plurality of LEDs is turned on according to an example of the present technology.
Figure 4B:
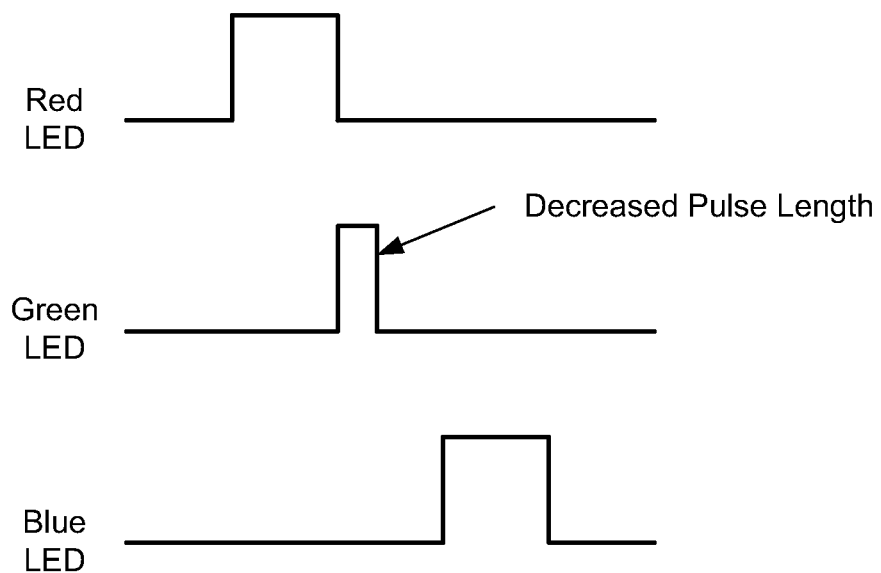

FIGS. 4A and 4B are exemplary square waveforms indicating when a particular LED out of a plurality of LEDs is powered on by the power microprocessor. As previously discussed, the power microprocessor may operate in combination with a plurality of circuit elements to power the LEDs. As shown in FIG. 4A, the power microprocessor may power a plurality of LEDs, such as a red LED, a green LED, and a blue LED. In one example, powering more than a single LED at the same time may exceed the amperage limitations of the circuit elements. Therefore, the power microprocessor may power the red LED when the green LED and the blue LED are not receiving power. Similarly, the power microprocessor may power the green LED when the red LED and the blue LED are not receiving power, as well as power the blue LED when the red LED and the green LED are not receiving power. The power microprocessor may power a particular LED by sending a pulse to the LED. If the frequency of the AC power is at 60 Hz, then the power microprocessor may send a pulse for each of the three LEDs (e.g., red, green and blue) 60 times per second.

As shown in FIG. 4B, the power microprocessor may vary a duty cycle (i.e., a pulse length) for any of the three LEDs. For example, the power microprocessor may shorten the duty cycle for the green LED. In general, the power microprocessor may increase or decrease the duty cycles of the red, green and blue LEDs so that the LEDs produce colors other than red, green and blue. Thus, varying the duty cycles may produce LED colors that appear to be purple, orange, etc. The power microprocessor may vary the duty cycles of the red, green and blue LEDs according to a plurality of settings (e.g., 512 settings) to produce the various colors of light.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the technology. One skilled in the relevant art will recognize, however, that the technology can be practiced without one or more of the specific details, or with other methods, components, materials, etc. In other instances, well-known structures, materials, or operations are not shown or described in detail to avoid obscuring aspects of the technology.

While the foregoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A system for providing unconditioned power using an alternating current (AC) power source in order to power light emitting diodes (LEDs), comprising:
    a plurality of light emitting diodes (LEDs);
    a microprocessor to send pulse-width modulated power signals to power the plurality of LEDs;
    a zener diode to limit a voltage provided to the microprocessor from the AC power source; and
    a varistor in series with the zener diode to clamp down the voltage from the AC power source to a pre-defined value to resist current in rush to the microprocessor.

2. The system as in claim 1, further comprising a capacitor configured to smooth power provided to the microprocessor.

3. The system as in claim 1, further comprising a diode for half wave rectification of the AC power source.

4. The system as in claim 1, further comprising a resistor in series with the varistor and zener diode to restrict current supplied to the microprocessor and LEDs with a rating of 5 volts or less.

5. The system as in claim 1, further comprising using LEDs with a rating above 5 volts.

6. The system as in claim 1, wherein the plurality of LEDs include a red LED, blue LED, and a green LED.

7. The system in claim 1, wherein current sent to the LEDs by the microprocessor is interleaved so one LED is powered at a time.

8. The system as in claim 1, wherein the microprocessor is powered from a same power source as the LEDs.

9. The system as in claim 1, wherein the varistor is a metal-oxide varistor.

10. The system as in claim 1, wherein the LEDs, microprocessor, zener diode and varistor are on a single printed circuit board (PCB).

11. A system for modifying alternating current (AC) power supplied to light emitting diodes (LEDs), comprising:
    a plurality of light emitting diodes (LEDs);
    a microprocessor to send pulse-width modulated power to the plurality of LEDs, wherein each LED receives power at an interleaved rate;
    a zener diode to limit voltage provided to the microprocessor;
    a capacitor configured to smooth a power signal provided to the microprocessor;
    a varistor to clamp down on current in rush to the microprocessor;
    a resistor in series with the varistor and zener diode to restrict current provided to the microprocessor; and
    a diode for half wave rectification of the voltage.

12. The system as in claim 11, wherein the LEDs, microprocessor, zener diode, diode, varistor, capacitor and resistor are on a single printed circuit board (PCB).

13. The system as in claim 11, wherein the plurality of LEDs include a red LED, blue LED, and a green LED.

* * * * *